United States Patent Office 3,424,791
Patented Jan. 28, 1969

3,424,791
PROCESS FOR THE PREPARATION OF DERIVATIVES OF N-ACYL VINYLAMINE
Peter Kurtz, Leverkusen, and Hans Disselnkötter, Cologne-Stammheim, Germany, assignors to Farbenfabriken Bayer Aktiengesellschaft, Leverkusen, Germany, a corporation of Germany
No Drawing. Filed Feb. 16, 1966, Ser. No. 527,733
Claims priority, application Germany, Mar. 6, 1965, F 45,437; Oct. 13, 1965, F 47,408
U.S. Cl. 260—558          5 Claims
Int. Cl. C07c 85/00, 103/20

ABSTRACT OF THE DISCLOSURE

A process producing N-acyl vinylamines by thermally splitting N-acryl derivatives of 1-amino-1-cyanoethane and its corresponding substituents at normal or reduced pressure and a temperature of about 250–750° C.

---

The invention relates to a new process for the preparation of derivatives of N-acylvinylamine by thermal splitting from N-acyl derivatives of 1-amino-1-cyanoethane and its substitution products with elimination of hydrogen cyanide.

A process is known in which acetylene is made to react at elevated temperature and under pressure in the presence of strongly alkaline catalysts on the imides or amides of carboxylic acid or of sulphonic acid, which amides or imides are unsubstituted in the imido group and are substituted on the amide nitrogen by an alkyl or aryl radical. Vinyl imides or amides which contain in addition to the vinyl group a further alkyl or aryl radical on the nitrogen of the acid amide are prepared by this process (see German patent specification 877,757 and German patent specification 890,508).

The same compounds are obtained by the process according to U.S. patent specification 2,231,905 which describes the thermal splitting off of acetic acid from N-(β-acetoxyethyl)-substituted dicarboxylic acid imides or N-(β-acetoxyethyl)-substituted carboxylic acid amides which carry in addition a further alkyl or aryl radical on the acid amide nitrogen.

A disadvantage of this process lies in the unstisfactory yields and the difficulties which occur in working up the pyrolysate (see U.S. patent specification 3,008,992). In addition, the acetic acid formed by the thermal splitting constitutes a waste product which cannot be used directly for the preparation of new starting material.

In column 1, lines 38–45 of U.S. patent specification 2,231,905 it is further pointed out that in the pyrolysis of N-(β-acetoxyethyl)-carboxylic acid amides which contain a hydrogen atom on the carboxylic acid amide nitrogen atom, oxazolines in other words ring compounds, are formed.

In contrast to this, the process according to the invention enables N-acylvinylamines and their derivatives of Formula III below, to be obtained by a direct reaction and in good yields by splitting of a carbon-carbon bond and splitting off of hydrogen cyanide. The hydrogen cyanide which has been split off can be used direct for the preparation of new starting material.

It has now been found, surprisingly, that N-acyl derivatives of 1-amino-1-cyanoethane and N-acyl derivatives of the substitution products of 1-amino-1-cyanoethane can be converted directly by thermal splitting at 250 to 750° C. into the corresponding N-acylvinylamines or substituted N-acylvinylamines with splitting off of hydrogen cyanide.

By 1-amino-1-cyanoethane and substitution products of 1-amino-1-cyanoethane are meant compounds of Formula I.

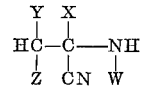

I

In this formula,

X, Y, and Z denote a hydrogen atom or a linear or branched alkyl radical with 1–6 C atoms, preferably 1–3 C atoms;
X and Y or Y and Z together denote the ring members of a carbocyclic ring, preferably of a 5- or 6-membered ring,
W denotes a hydrogen atom or a linear or branched alkyl radical, preferably with 1–6 C atoms.

The acyl radicals can theoretically be derived from the corresponding carboxylic acids. In principle, it would be possible to have any acyl radical of any known monocarboxylic acid in the N-acyl derivatives of 1-amino-1-cyanoethane of Formula I, which derivatives are to undergo pyrolysis. In compounds which contain acyl radicals of higher molecular weight monocarboxylic acids, thermal splitting is more difficult and the yields of vinylacylamines become lower. It is, therefore, preferred to use those compounds for pyrolysis which contain the acyl radicals of aliphatic monocarboxylic acids with 1–6 C atoms or of aromatic carboxylic acids such as benzoic acid or naphthoic acid, which may if desired be substituted by halogen such as chlorine or bromine or by linear or branched alkyl radicals with 1–4 C atoms.

The N-acyl derivatives of 1-amino-1-cyanoethane and its substitution products thus preferably correspond to the general Formula II in which the radicals X, Y, Z and W have the same meaning as in Formula I and R represents the acyl radicals of aliphatic monocarboxylic acids with 1–6 C atoms or of aromatic carboxylic acids such as benzoic acid or naphthoic acid, which may be substituted by halogen such as chlorine or bromine or by linear or branched alkyl radicals with 1 to 4 C atoms:

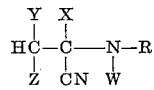

II

The thermal splitting of the above starting materials proceeds in accordance with the following reaction scheme

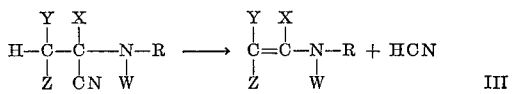

III in which X, Y, Z, W and R have the same meaning as in the previous formulae.

The N-acyl derivatives of 1-amino -1-cyanoethane used as starting materials in the process of the invention are obtained by known methods from α-aminopropropionitrile by acylation in yields above 90% by weight based on the α-aminopropionitrile, the latter being in turn easily prepared in quantitative yields from acetaldehyde, hydrogen cyanide and ammonia. In order to effect acylation, the usual agents are employed such as carboxylic acid halides, carboxylic acid anhydrides, carboxylic acid esters or, in the special case of actetylation, ketene may be used.

The N-acyl-N-alkyl derivatives of 1-amino-1-cyanoethane can be obtained in good yields by known processes by acylation of 1-alkylamino-1-cyanoethane which in turn is readily accessible from acetaldehyde hydrogen cyanide and primary aliphatic or cycloliphatic amines.

When aliphatic or cycloaliphatic aldehydes or ketones of more than two C-atoms are reacted with hydrogen cyanide and then with ammonia or primary aliphatic or cycloaliphatic amines by known processes, compounds of Formula I are obtained with at least one of the radicals X, Y or Z substituted. For acylation of these compounds the usual agents are again employed, such as carboxylic acid halides, carboxylic acid anhydrides and carboxylic acid esters, and ketene in the special case of acetylation.

The process according to the invention may be carried out by introducing the compounds of Formula II in the liquid form, but preferably in the vapour phase, into a reaction tube which is heated to 250 to 750°C., preferably 450 to 650°C., and which is filled with solid bodies such as glass, quartz, iron, silicon carbide, aluminum fluoride, coke, lithopone, calcium phosphate or alumina to increase the reactive surface.

It is advantageous to use an inert carrier gas such as nitrogen, hydrogen or argon at the same time. Pyrolysis may be carried out e.g. under normal pressure or reduced pressure, preferably at 1 to 100 mm. Hg. In the preferred embodiment of the process of the invention, pyrolysis is carried out under reduced pressure. The products in vapour form of pyrolysis or unreacted starting products leaving the reaction tube are condensed with the aid of suitable cooling systems and then subjected to a fractional distillation. The hydrogen cyanide formed in the course of pyrolysis, which is obtained as the first fraction, is used again for the preparation of starting material. The N-acyl vinylamines of Formula III which then distil over are obtained in an excellent state of purity and very high yields of over 80% by weight based on the pyrolysed N-acyl derivatives of 1-amino-1-cyanoethane and its substitution products. The distillation residue, which is formed by unpyrolysed starting material, can be returned to the thermal splitting process either directly or after purification, e.g. by distillation or recrystallisation.

The process according to the invention can be carried out intermittently or continuously.

When working up the products of pyrolysis of the process according to the invention, which may be effected by distillation, it is sometimes an advantage to add a small quantity of a stabiliser in order to prevent polymerisation. Such stabilisers include: phenols such as hydroquinone, amines such as N-phenyl-β-naphthylamine, phenothiazine.

The N-acylvinylamines and their substitution products of Formula III obtained by the process according to the invention are obtained in good yields of 73 to over 90% of the theoretical. Their constitution is confirmed by analysis and the IR spectrum.

The N-acylvinylamines of Formula III obtained are suitable for the preparation of intermediate products and can be copolymerised with polymerisable monomers.

The N-formyl-1-amino-1-cyanoethane used in Example 1 as starting material for the process of the invention is obtained as follows:

Excess methyl formate is pumped into an autoclave containing α-aminopropionitrile and the mixture is heated for 4 hours at 100° C. The contents of the autoclave are then distilled by fractional distillation. When the methanol and the excess formic acid ester used in the reaction have distilled off, N-formyl-1-amino-1-cyanoethane is obtained at 115 to 130° C. and a pressure of 0.2 mm. Hg in a yield of over 90% by weight. $n_D^{20}$:1.4550.

EXAMPLE 1

The apparatus used for pyrolysis consists of a heatable vertical quartz tube of 2 cm. diameter and 56 cm. length filled with quartz lumps. At the top end of the reaction tube is a dropping funnel and at the bottom end a cooler with receiver which in turn is connected to a deep freeze trap. The apparatus is designed to be evacuated.

The apparatus is evacuated down to 5 mm. Hg and heated to about 600° C. 300 g. of N-formyl-1-amino-1-cyanoethane are introduced through the top end of the tube over three hours. The vaporous products of pyrolysis and unreacted starting material escaping from the lower end of the tube are cooled by the cooling device and condensed.

45 g. of hydrogen cyanide=54.5% by weight of the theoretical based on N-formyl-1-amino-1-cyanoethane are isolated from the deep freeze trap. The receiver contains 250 g. which is subjected to fractional distillation. At a pressure of 12 mm. Hg, 100.2 g. of N-formylvinylamine= 46% by weight of the theoretical based on N-formyl-1-amino-1-cyanoethane distil over at 85 to 86.5° C. The next fraction obtained is 128 g. of pure starting material, N-formyl-1-amino-1-cyanoethane of refractive index $n_D^{20}$:1.4550. The N-formyl-vinylamine of B.P.$_{12mm}$. 85–86.5° C. and $n_D^{20}$:1.4940 has the following analysis data:

Analyses based on $C_3H_5NO$.—Calculated: C, 50.69%; H, 7.09%; N, 19.71%; O, 22.51%. Found: C, 50.40%; H, 7.04%; N, 19.56%; O, 22.64%. Molecular weight: 71.08.

The constitution is determined by IR spectrum analysis: NH valency vibration at 3,250 cm.$^{-1}$ (strong), CO at 1,675 cm.$^{-1}$ (very strong), double bond 1,640 cm.$^{-1}$ (very strong), NH deformation 1,510 cm.$^{-1}$ (medium), terminal vinyl group 862 cm.$^{-1}$ (medium), 975 cm.$^{-1}$ (medium). Taking into account the recovered portions of N-formyl-1-amino-1-cyanoethane, the following yields are calculated for the pyrolysed products: N-formyl-vinylamine 80.5%, hydrogen cyanide 95%.

EXAMPLE 2

A mixture of 250 g. N-acetyl-1-amino-1-cyanoethane and 25 ml. benzene is allowed to drip from a steam heated dropping funnel in the course of 150 minutes into a vertical porcelain tube which is filled with quartz shards and which is heated to 600° C. over a length of 62 cm. A cooled glass flask which is connected to a water jet pump through a reflux cooler and a trap cooled to —80° C. serves as receiver. A slow stream of nitrogen is passed by means of a capillary tube through the apparatus. During pyrolysis, the apparatus is under a reduced pressure of 20 mm. Hg. At the end of the experiment, the receiver flask contains 193 g. reaction product in the form of almost colourless crystals of melting point 47° C. and in the cooling trap are 69 g. of a mixture of hydrogen cyanide and benzene with a hydrogen cyanide content of 48 g. (=80% by weight of the theoretical). Distillation of the crystallised reaction product yielded at 68 to 75° C. under 0.6 mm. Hg, 133 g. (=70% by weight of the theoretical) of N-acetyl-vinylamine of melting point 53° C.

The distillation residue of 57 g. consists of almost pure starting material.

The N-acetyl vinylamine yield is 91% by weight of the theoretical, based on pyrolysed N-acetyl-1-amino-1-cyanoethane.

EXAMPLE 3

In the same apparatus as in Example 2, 342 g. of N-butyryl-1-amino-1-cyanoethane were cracked thermally over 5.7 hours at 600° C. The yield of crude product was 267 g. Distillation yielded 165 g. (=60% by weight of the theoretical) of pure N-butyryl-vinylamine of melting point 36° C. and boiling point 70 to 80° C./0.4 mm. Hg. in addition to 57 g. (=17% by weight of the theoretical) of starting material. Based on the cracked starting material, the yield of N-butyryl-vinylamine is 72% by weight.

EXAMPLE 4

To the same apparatus as in Example 2, 50 g. of N-benzoyl-1-amino-1-cyanoethane together with 10 ml. of benzene were added dropwise in the course of 1 hour from a steam heated dropping funnel. Pyrolysis carried out at 600° C. under nitrogen yielded 37 g. of a solid crude product. In addition, a deep freeze trap contained 11.6 g. of a condensate which was found on titration to contain 4.6 g. of hydrogen cyanide, which is 59% of the theoretical quantity which could be split off. 10.5 g. of N-benzoylvinylamine (=25% by weight of the theoretical) were obtained from the crude product by distillation (120° C./0.3 mm. Hg). The residue yielded 18 g. of starting material recrystallised from benzene. The yield of N-benzoyl-vinylamine is thus 39% by weight of the theoretical, based on the amount of starting material used up.

EXAMPLE 5

50 g. of N-3-chlorobenzoyl-1-amino-1-cyanoethane (M.P. 108° C.) were put through the same apparatus as in Example 2 in the course of 30 minutes at 500° C./12 mm. Hg. The yield of crude product is 37 g.=85% of theoretical. Recrystallisation from carbon tetrachloride yields pure N-3-chlorobenzoyl-vinylamine of melting point 121° C., the structure of which is confirmed by analysis as well as by the infra-red and nuclear resonance spectrum.

EXAMPLE 6

100 g. of N-(α-naphthoyl)-1-amino-1-cyanoethane (M.P. 138 to 139.5° C.) are melted and passed in the course of 235 minutes from a heatable dropping funnel through a vertical stainless steel tube which was filled with quartz shards and heated electrically to 600° C. over a length of 62 cm. and was under pressure of 16 mm. Hg.

By the end of the experiment, 81 g. (=91% of the theoretical) of a brown mass permeated by crystals, which constitutes the reaction product, have collected in the receiver whilst the deep freeze trap contains 12 g. (=100% of the theoretical) of hydrogen cyanide. 10 g. of the reaction product are distilled off. The fractions (1.5 g.) which pass over between 50 and 180° C./0.3 mm. Hg. solidify in the receiver. These crystals are recrystallised several times from cyclohexane and then melt at 118° C. On the basis of analyses of IR- and nuclear resonance spectra, they consist of N-(α-naphthoyl)-N-vinylamine.

EXAMPLE 7

The apparatus for pyrolsis consists of a heatable vertical quartz tube of 3 cm. diameter and 56 cm. length, which is filled with quartz pieces. At the top end of the reaction tube is a dropping funnel, at the lower end a cooler with receiver to which is connected a deep freeze trap. The apparatus is designed to be evacuated.

The apparatus is evacuated to 10 to 13 mm. Hg and heated to 620 to 630° C. 400 g. of N-acetyl-N-methyl-1-amino-1-cyanoethane are added dropwise in the course of 190 minutes. The vaporous products of pyrolysis and unreacted starting material leaving the lower end of the tube are cooled by the cooling apparatus and condensed. The deep freeze trap contains 32 g. of hydrogen cyanide. The contents of the receiver are separated into a distillate and a residue by a thin layer evaporator. The residue (278 g.) consists of reacted starting material.

The distillate (77 g.) is fractionated after addition of about 0.1% phenothiazine as stabiliser. After a small amount of first runnings, the N-acetyl-N-methyl-vinylamine distils over at 59° C./15 mm. Hg ($n_D^{20}$=1.4810).

Analysis: $C_5H_9NO$.—Calculated: C, 60.58%; H, 9.15%; N, 14.13%; O, 16.14%. Found: C, 60.26%; H, 9.29%; N, 14.30%; O, 16.14%. Molecular weight: 94.13.

Its constitution is obtained from IR spectrum analysis The band for the carbonyl group lies at 1670 cm.$^{-1}$ (very strong), for the carbon-carbon double bond at 1620cm.$^{-1}$ (very strong) and for the terminal vinyl group at 990 cm.$^{-1}$ (medium) and 840 cm.$^{-1}$ (medium).

Its constitution is also confirmed by the nuclear resonance spectrum.

The N-acetyl-N-methyl-vinylamine yield is 81% of the theoretical, based on the pyrolysed product. The hydrogen cyanide split off in this reaction is obtained in almost quantitative yield.

EXAMPLE 8

50 g. of N-propionyl-N-ethyl-1-amino-1-cyanoethane are pyrolysed in contact with quartz shards in the apparatus indicated in Example 1 in the course of 110 minutes at 600° C./15 mm. Hg with the adition of 1 g. of N,N'-ethylenepiperazine. 38 g. of reaction product (92% by weight of theoretical) condense in the receiver which yields N-propionyl-N-ethyl-vinylamine when fractionated in a fractionating column. B.P.$_{12mm}$ 70–72° C.; $n_D^{20}$: 1.4700.

Analysis: $C_7N_{13}NO$. Calculated: C, 66.10%; H, 10.30%; N, 11.01%; O, 12.58%. Found: C, 66.03%; H, 10.42%; N, 11.29%; O, 12.29%. Molecular weight: 127.18.

EXAMPLE 9

The pyrolysis is carried out in the same apparatus as described in Example 7.

The apparatus is evacuated to 8 mm. Hg. 100 g. of N-formyl-l-cyano-l-aminobutane are dripped from the dropping funnel in the course of 50 to 60 minutes through the quartz tube which is heated to 440–460° C. in Experiment A, to 550–560° C. in Experiment B and to 600–610° C. in Experiment C.

The reaction products obtained in these three experiments are fractionated. The first fraction which distils over at 73–75° C./0.2 mm. Hg, is a mixture of cis and trans-N-formyl-butene(1)-yl(1)-amine ($n_D$=1.4935). The next fraction distils over at 98–107° C./0.2 mm. Hg and is unchanged starting material ($n_D^{20}$=1.4595). The yield of N-formyl-butene-(1)-yl(1)-amine is summarised in the following table.

| | A | B | C |
|---|---|---|---|
| Based on quantity of starting product, percent by weight | 20 | 25 | 31 |
| Based on the quantity after removal of recovered starting material, percent by weight | 80 | 71 | 42 |

In Experiment C, gaseous decomposition products are also formed.

The hydrogen cyanide yield is almost quantitative in the three experiments. The constitution of the reaction product is determined by analysis and the IR spectrum.

Analysis: $C_5H_9NO$. Calculated: C, 60.58%; H, 9.15%; N, 14.13%; O, 16.14%. Found: C, 60.34%; H, 9.35%; N, 14.47%; O, 16.15%. Molecular weight: 99.13.

| IR spectrum: Bands for: | cm.$^{-1}$ |
|---|---|
| NH valency vibration (strong) | 3,260 |
| NH deformation (strong) | 1,505 |
| CO double bond (very strong) | 1,660 |
| Trans C=C double bond (strong) | 948 |
| Cis C=C double bond (medium) | 750 |

The nuclear resonance spectrum confirms the constitution of the reaction product.

EXAMPLE 10

80 g. of N-acetyl-2-amino-isobutyronitrile (N-acetyl-2-amino-2-cyanopropane) are added dropwise, after addition of 16 ml. of benzene and 160 mg. of phenothiazine, from a heated dropping funnel in the course of 135 minutes into a vertical steel tube filled with quartz shards and heated to 600° C. under 15 mm. Hg. 44.5 g, of crude product are collected in a receiver, of which 20.3 g. (=31% by weight of theoretical) distil over at 75 to 80° C./0.3 mm. Hg. M.P. 77–79° C., after crystallization from benzene/petroleum ether M.P. 80–81° C. According to analysis and the spectra, the substance is N-acetyl-isopropenylamine. The fraction distilling over above 80° C./0.3 mm. Hg consists of a mixture of N-acetyl-isopropenyl-amine with unchanged starting material.

Analysis: $C_5H_9NO$. Calculated: C, 60.58%; H, 9.15%; N, 14.13%; O, 16.14%. Found: C, 60.58%; H, 9.22%; N, 14.14%; O, 16.48%. Molecular weight: 99.13.

EXAMPLE 11

50 g. of N - acetyl - 2 - amino - 2 - methylbutyronitrile (N-acetyl-2-amino-2-cyano-butane) are pyrolysed without additive in the course of 50 minutes at 600° C. and 15 mm. Hg in the apparatus described above. 35.1 g. of crude product condense in the receiver and 10 g. of hydrogen cyanide (100% of theoretical) in a deep freeze trap. On distillation, the crude product yields 29.5 g. of a fraction boiling at 70–75° C./0.15 mm. Hg which according to analysis and the spectra consists of comparable quantities of the isomer.

$$CH_3-CO-NH-C\diagup^{CH_2}_{\diagdown CH_2-CH_3}$$

$$CH_3CONHC\diagup^{CH_3}_{\diagdown CH-CH_3}$$

Yield: 73 percent of weight of the theoretical.

Analysis $C_6H_{11}NO$.—Calculated: C, 63.68%; H, 9.80%; N, 12.38%; O, 14.14%. Found: C, 62.72%; H, 9.62%; N, 12.67%; O, 14.39%. Molecular weight: 113.16.

EXAMPLE 12

50 g. of N-acetyl-2-amino-isovaleronitrile (N-acetyl-1-amino-1-cyano-2-methylpropane) yield, when pyrolysed in an analogous manner for 70 minutes at 500° C., 9 g. of hydrogen cyanide (93% by weight of theoretical) and 40 g. of crude pyrolysate (99% by weight of theoretical) of which 31.5 g. (78% by weight of theoretical) boil at 72 to 73° C./0.05 mm. Hg. Analyses and spectra confirm the structures of the product viz:

$$(CH_3)_2C=CH-NH-CO-CH_3$$

Analysis $C_6H_{11}NO$.—Calculated: C, 63.68%; H, 9.80%; N, 12.38%; O, 14.14%. Found: C, 63.64%; H, 9.75%; N, 12.78%; O, 13.85%. Molecular weight: 113.16.

EXAMPLE 13

100 g. of N-acetyl-1-amino - 1 - cyano-cyclohexane are passed in the course of 60 minutes through the apparatus described in Example 9. The temperature of the tube is 450° C. The pressure at which pyrolysis is carried out is 3 mm. Hg.

The reaction product obtained is distilled, the fractions distilling over at 115° to 118° C./0.15 mm. Hg solidify on cooling, the crystals are recrystallised from cyclohexane and melt at 64 to 65° C.

As indicated by analysis, IR- and nuclear resonance spectra, the crystals consist of N-acetyl-cyclohexene (1)-yl-(1) amine.

Analysis $C_8H_{13}NO$.—Calculated: C, 69.03%; H, 9.41%; N, 10.06%; O, 11.50%. Found: C, 68.84%; H, 9.40%; N, 10.28%; O, 11.58%. Molecular weight: 139.19.

The yield is 75% by weight of the theoretical, based on the quantity of starting material put into the reaction, and 85% by weight of the theoretical based on the quantity of starting material converted. Hydrogen cyanide is obtained in an almost quantitative yield according to the amount of starting material reacted.

EXAMPLE 14

By the method described in Example 9, 100 g. of N-acetyl-N-methyl-2-amino-2-cyanopropane were pyrolysed in each case in three experiments (A, B, C). The experimental conditions were as follows:

| | Duration, min. | Temperature, ° C. | Pressure, mm. Hg |
|---|---|---|---|
| Experiment: | | | |
| A | 75 | 440–480 | 3 |
| B | 120 | 480–530 | 3 |
| C | 120 | 510–550 | 3 |

The crude products of pyrolysis obtained were as follows:

| | In the receiver, g. | In the deep-freeze trap, g. | Total, g. |
|---|---|---|---|
| Experiment: | | | |
| A | 95.0 | 4.0 | 99.0 |
| B | 89.5 | 10.0 | 98.5 |
| C | 81.0 | 18.0 | 99.0 |

The hydrogen cyanide split off, the reaction product, the N-acetyl-N-methyl-isopropenyl-amine (boiling point 62–64° C./13 mm. Hg $n_D^{20}$ 1.4530) and the unreacted starting product (boiling point 94–99° C./0.4 mm. Hg) M.P. 62–63° C.) were separated by distillation.

| | HCN, g. | Reaction product, g. | Starting product, g. |
|---|---|---|---|
| Experiment: | | | |
| A | 0.5 | 6.7 | 85.3 |
| B | 5.7 | 26.0 | 61.7 |
| C | 11.0 | 40.3 | 39.7 |

The yields were as follows:

| | HCN, percent by weight | | $CH_2=C-N-CO-CH_3$ <br> $\quad\quad\vert$ <br> $\quad\ CH_3CH_3$ | |
|---|---|---|---|---|
| | Based on quantity of starting product put into the reaction | Based on quantity of starting product reacted | Based on quantity of starting product put into the reaction, percent | Based on quantity of starting product reacted, percent |
| Experiment: | | | | |
| A | 2.6 | 18 | 8.3 | 36 |
| B | 30 | 77 | 32 | 84 |
| C | 52 | 95 | 50.5 | 81.5 |

The constitution of the N-acetyl-N-methyl-isopropenyl-amine obtained was confirmed by analysis, IR spectrum and nuclear resonance spectrum.

Analysis $C_6H_{11}NO$.—Calculated: C, 63.68%; H, 9.80%; N, 12.38%; O, 14.14%. Found: C, 63.70%; H, 10.05%; N, 12.07%; O, 14.00. Molecular weight: 113.16.

EXAMPLE 15

30 g. of N-acetyl-2-amino-2-cyclohexyl-acetonitrile are pyrolysed over 26 minutes at 600° C./13 mm. Hg in the apparatus described previously. The hydrogen cyanic split off can be isolated quantitatively from a deep-freeze trap connected to the apparatus. In the receiver maintained at 25° C., 24.8 g. (97% by weight of theoretical) of crystallised N-acetyl-cyclohexylidene-methylamine are collected which on recrystallisation melts at 111° and can be sublimated at 110° C./0.07 mm. Hg. The product is identified by combustion analysis and by the infra-red spectrum and the nuclear resonance spectrum.

Analysis $C_9H_{15}NO$.—Calculated: C, 70.32%; H, 10.05%; N, 9.01%; O, 10.67%. Found: C, 70.55%; H, 9.87%; N, 9.14%; O, 10.44%. Molecular weight: 153.22.

What is claimed is:

1. A process for producing an N-acyl vinylamine of the formula $$\begin{array}{cc} Y & X \\ | & | \\ C=C-N-R \\ | & | \\ Z & W \end{array}$$

comprising introducing into a reactor a vaporized compound of the formlua $$\begin{array}{cc} & Y & X \\ & | & | \\ H-C-C-N-R \\ & | & | \\ & Z & CN & W \end{array}$$

wherein X, Y and Z are members selected from the group consisting of hydrogen, alkyl of 1–6 carbon atoms; W is hydrogen or alkyl of 1–6 carbon atoms; and R is an acyl radical of
  (1) an alkyl monocarboxylic acid of 1–6 carbon atoms
  (2) benzoic acid,
  (3) napthoic acid, or
  (4) corresponding halo or alkyl-substituted acyl, said alkyl substituent having 1–4 carbon atoms; subjecting the reactant to a temperature of about 250° C.–750° C. at normal or reduced pressure, and recovering the resulting product.

2. Process of claim 1 wherein the reaction is carried out at a pressure of about 1–100 mm. Hg.

3. The process of claim 1 wherein R is a member selected from the group consisting of formyl, acetyl, propionyl, butyryl, benzoyl, halobenzoyl, alkyl benzoyl, napthoyl and alkyl napthoyl, the alkyl moiety thereof having 1–6 carbon atoms.

4. Process of claim 1 wherein the reaction is carried out at a temperature of about 450–650° C.

5. Process of claim 1 wherein the reaction is carried out under reduced pressure.

References Cited

UNITED STATES PATENTS 3,249,625   5/3/1966   Bestian et al. _____ 260—558

H. I. MOATZ, *Assistant Examiner.*